(12) United States Patent
López-Cuervo Medina et al.

(10) Patent No.: US 12,442,743 B2
(45) Date of Patent: Oct. 14, 2025

(54) METHOD AND SYSTEM FOR DETERMINING THE MECHANICAL STATE OF AN AGRICULTURAL LAND

(71) Applicant: Bellota Agrisolutions, S.L., Legazpia (ES)

(72) Inventors: Serafín López-Cuervo Medina, Legazpia (ES); Francisco Lamas López, Legazpia (ES); Miren Bakarne Lazcano Lasa, Legazpia (ES)

(73) Assignee: Bellota Agrisolutions, S.L., Guipuzcoa (ES)

( * ) Notice: Subject to any disclaimer, the term of this patent is extended or adjusted under 35 U.S.C. 154(b) by 0 days.

(21) Appl. No.: 17/442,677

(22) PCT Filed: Mar. 12, 2020

(86) PCT No.: PCT/ES2020/070174
§ 371 (c)(1),
(2) Date: Sep. 24, 2021

(87) PCT Pub. No.: WO2020/193826
PCT Pub. Date: Oct. 1, 2020

(65) Prior Publication Data
US 2022/0163436 A1   May 26, 2022

(30) Foreign Application Priority Data
Mar. 26, 2019   (ES) .................................. 201930272

(51) Int. Cl.
*A01B 79/00* (2006.01)
*A01B 63/14* (2006.01)
(Continued)

(52) U.S. Cl.
CPC ............. *G01N 3/405* (2013.01); *A01B 63/14* (2013.01); *A01B 79/005* (2013.01); *G01N 33/24* (2013.01);
(Continued)

(58) Field of Classification Search
CPC ....... A01B 79/00; A01B 79/005; A01B 63/02; A01B 63/14; G01N 33/245; G01N 33/24; G01N 3/405
See application file for complete search history.

(56) References Cited

U.S. PATENT DOCUMENTS 10,561,056 B2 *   2/2020   Peterson ............... A01B 63/008
11,191,206 B2 *  12/2021   Eising ...................... A01C 7/08
(Continued)

FOREIGN PATENT DOCUMENTS

| DE | 102009000351 A1 | 7/2010 |
|---|---|---|
| WO | 2015164791 A1 | 10/2015 |
| WO | 2018224790 A1 | 12/2018 |

*Primary Examiner* — Jamie L McGowan
(74) *Attorney, Agent, or Firm* — The Webb Law Firm (57) ABSTRACT

The present disclosure relates to a method and a system for determining the mechanical state of an agricultural land, wherein sensors, arranged in a tillage element of an agricultural machine, obtain measurements of a vibratory signal which is the product of the tillage operation of the agricultural machine on the land. Communication means send said measurements in data packets to a processor module. The processor module transfers the measurements to the frequency domain and calculates energy measurements in order to finally determine the mechanical state of the agricultural land, based on the analysis of said calculated energies, wherein the mechanical state determined comprises a degree of hardness and a degree of plasticity.

15 Claims, 4 Drawing Sheets

(51) Int. Cl.
*G01N 3/40* (2006.01)
*G01N 33/24* (2006.01)

(52) U.S. Cl.
CPC ... *G01N 33/245* (2024.05); *G01N 2203/0658* (2013.01); *G01N 2203/0676* (2013.01)

(56) References Cited

U.S. PATENT DOCUMENTS

| | | |
|---|---|---|
| 2002/0107625 A1 | 8/2002 | Beck et al. |
| 2006/0276949 A1* | 12/2006 | Beck ............... A01D 75/18 701/50 |
| 2013/0211628 A1 | 8/2013 | Thurow et al. |
| 2016/0262300 A1 | 9/2016 | Gates |
| 2018/0310465 A1* | 11/2018 | Peterson ........... A01B 63/111 |
| 2019/0059209 A1 | 2/2019 | Brune et al. |
| 2020/0072809 A1* | 3/2020 | Bhanu ............... G01N 29/036 |
| 2022/0163436 A1* | 5/2022 | López-Cuervo Medina ............ A01B 79/005 |

\* cited by examiner

METHOD AND SYSTEM FOR DETERMINING THE MECHANICAL STATE OF AN AGRICULTURAL LAND

CROSS-REFERENCE TO RELATED APPLICATIONS

This application is the United States national phase of International Application No. PCT/ES2020/070174 filed Mar. 12, 2020, and claims priority to Spanish Patent Application No. P201930272 filed Mar. 26, 2019, the disclosures of which are hereby incorporated by reference in their entirety.

BACKGROUND

Field of the Invention

The present disclosure relates to the technical field of methods and systems for controlling agricultural production and more specifically to methods and systems for collecting data using sensors arranged in agricultural machines in order to optimize tillage, the use of agricultural implements and sowing.

Technical Background

Currently, the use of instruments or agricultural implements for preparing the land and the subsequent sowing of agricultural crops is one of the most important tasks in relation to the correct planting of the crops in agriculture.

The energy cost of the tasks associated with preparing and sowing the soil (breaking, loosening or mixing the soil; destroying, burying or mixing wastes; levelling, etc. . . . ) forces farmers to select whether or not to execute each task, sometimes dispensing with one of them for economic reasons to the detriment of the advantages of the use thereof for growing crops.

The trend in the industry is to optimize the agricultural tasks in order to establish the optimal management of the tillage, integrating several tasks on the land in fewer passes or even in a single pass. Thus, it is essential to know the state of the soil during the task of preparing agricultural land, which enables the assessment, planning and decision-making regarding the work to be performed with the agricultural implements, both in the soil preparation and in the sowing.

The mechanical parameters of the soil, such as hardness, plasticity or moisture, influence the optimal configuration of the equipment to be used in the agricultural tasks, for which knowing them enables the performance of the task to be optimized, reduces costs and even enables the use of these tasks to be selectively expanded. Furthermore, this optimization increases the life of the agricultural tools, avoiding breakages which increase the completion time and decrease the productivity of the task, increasing the expenses of the agricultural task.

The state of the art offers different solutions for data collection, by means of the use of sensors associated with agricultural machines, with which different parameters of agricultural lands are determined. For example, the use of sensors has been known for years in order to determine the state of the crops by weighing the grain, measuring the moisture thereof or other characteristics of the crop, seeking to capture information about the crop or modify the application doses of agricultural products in real time.

Other solutions for the mechanical study of the soil envisage the use of sensors capable of determining parameters of the land by means of taking samples while stationary or extracting fractions for subsequent chemical analyses, which enables the pH and other parameters to be determined.

Solutions are also known which opt for data collection for subsequent electrical conductivity analyses and even optical determinations of the soil, associating it with the composition of the land, for example organic matter, in order to vary the dose of the seed in the sowing of the crop.

However, all the solutions offered by the state of the art are intended exclusively for the crop, the specific state thereof during growth and the sowing of the seeds, taking into account, for example, the organic properties of the soil. However, to date there are no proposals capable of effectively determining in real time the mechanical state of the soil with which to enable the use of agricultural implements for preparing the land and for sowing to be optimized.

For example, U.S. patent application publication US 20160262300 A1 discloses an apparatus which dynamically adapts ploughshares as a function of the conditions of the soil, but bases the operation thereof on sensors involving radar, temperature or measurements of the composition of the soil. The problem with this approach is that the conclusions, even assuming that they could be made in real time, are too general since they refer to areas of the land which are not strictly linked to the action of the ploughshares.

In another line of work, algorithms for determining vibrations applied to soil mechanics are known, capable of analyzing the bearing capacity of the land, but always based on vibration sensors and passive treatments of the vibration information, wherein the equipment is installed in specific positions, for example of a railroad track, in order to analyze the behavior of the railway platform and the soil/structure interaction in the face of an excitation external to the location thereof (rolling stock) and measure how this environment evolves over time.

Due to all the above, there is a need for a dynamic solution for controlling agricultural production based on the precise determination of the mechanical state of the soil in real time, which would be in line with techniques such as conservation tillage, direct sowing or precision agriculture.

SUMMARY

In order to achieve the objectives and avoid the aforementioned drawbacks, the present disclosure is based on an analysis of measurements obtained by moving sensors, wherein the excitation in this case (tractor/agricultural implement) is dynamic with respect to the object being examined (agricultural soil), which results in a massive extraction of data obtained from multiple positions which, once processed, provide a series of parameters which determine the relationship of the different typologies/behaviors of the worked land.

According to a non-limiting embodiment or aspect, provided is a method for determining the mechanical state of an agricultural land, including: obtaining, by sensor means arranged in a tillage element of an agricultural machine, measurements of a vibratory signal, wherein the vibratory signal is produced as a result of a tillage operation of the agricultural machine on the agricultural land; sending, by communication means, the measurements obtained from the vibratory signal, wherein the measurements obtained from the vibratory signal are grouped into packets of data, to a processor module; transforming, by the processor module, the measurements of the vibratory signal grouped into the data packets into a frequency signal; calculating energy measurements starting from the frequency signal; and determining the mechanical state of the agricultural land, based on the energy measurements of the frequency signal, wherein the mechanical state determined comprises a degree of hardness and a degree of plasticity.

In some non-limiting embodiments or aspects, the processor module transfers the measurements to the frequency domain, which enables the processor module to calculate energy measurements starting from the frequency signal such as the power spectral density (PSD) signal or the energy spectral density, from which the vibrations which are produced in the elements making up the agricultural implements can be filtered and determined. Thus, an automatic analysis of the mechanical state of the soil may be achieved, dynamically and in real time, and of how the elements used in agricultural implements for tillage and sowing act on the result of the land and enable the best possible bed to be left in order to optimize the subsequent planting of the crop.

In some non-limiting embodiments or aspects, the treatment in the frequency domain enables the information to be processed such as vibrations by establishing energy parameters which are able to eliminate noise in the readings obtained by the sensors and extract, on the one hand, parameters for strength and compaction of the land and on the other, the possible blockages of the working elements. Additionally, the treatment of data in the frequency domain enables the management of acceleration measurements capable of providing repeatability in the degree of compaction of agricultural lands under equivalent soil conditions.

In other non-limiting embodiments or aspects, the degree of hardness and the degree of plasticity of the agricultural land are determined as a function of a measurement of the amplitude of the PSD signal and a certain frequency band considered. In this manner, the vibrations in a certain frequency band may be characterized and thus it is possible to establish a correspondence between the plurality of mechanical states of the soil and different sets of mechanical parameters associated with different situations, which finally enables an agricultural database to be completed.

According to another non-limiting embodiment or aspect, determining the mechanical state of the agricultural land based on the comparison of a first energy pattern, corresponding to the calculated energy measurements, with a plurality of energy patterns which correspond to a plurality of mechanical states.

According to another non-limiting embodiment, provided is a method of communication flow for exchanging information which includes: sending the measurements of the sensor means to a main communication node arranged in the agricultural machine; sending information based on the measurements from the main node to a central server; and storing in the central server the information based on the measurements sent by the main node of each agricultural machine. Optionally, in scenarios with a very high number of sensors, the measurements of the sensor means can be channeled through several intermediate nodes with a bridge function, configured to receive and send measurements to the main node.

In other non-limiting embodiments or aspects, provided is a method for determining, by the processor module, a state of the tillage element according to a variation detected in a rotation frequency of the tillage element, wherein the state of the tillage element is selected from: a locking state of the tillage element or a state with a certain degree of wear.

According to another non-limiting embodiment or aspect, provided is a method for modifying, by an actuator of a control system, a physical parameter of the tillage element as a function of the determined mechanical state of the agricultural land, wherein the physical parameter is selected from: working depth, angle of attack of the tillage element, distance between tillage elements, pressure of the tillage element and rotation speed of the tillage element. As well as any other action envisaged in the agricultural machines to be used and the degrees of freedom of the tillage elements.

According to another non-limiting embodiment or aspect, the method for determining the mechanical state of an agricultural land further includes a frequency filtering stage, wherein one or more repeated frequencies of the frequency signal are eliminated, corresponding to vibrations inherent to the operation of the tillage element.

In some non-limiting embodiments or aspects, determining the mechanical state of the agricultural land by comparing with techniques linked to machine learning, such as neural networks or other grouping algorithms, a first energy pattern, corresponding to the energy measurements of the power spectral density signal, with a plurality of energy patterns corresponding to a plurality of mechanical states. To do so, the calculations made in the space of the frequencies, of the readings obtained, are integrated into a database which enables not only the specific data of each of the sensors to be known, but also the temporal evolution thereof, such that the techniques associated with artificial intelligence can correlate and classify the stored parameters of already-classified previous cases.

The techniques linked to machine learning and Artificial Intelligence, according to other non-limiting embodiments, work in two ways, on the one hand this enables the values to be determined for the current moment wherein the sensor is found, and on the other, it adds these new readings to the system in order to enrich the system in new determinations through an artificial intelligence or machine learning system, which progressively increases the knowledge of the behavior of the tillage elements in new locations and with different contour parameters which the system can find, as the dates wherein the system works in these lands change.

In another non-limiting embodiment or aspect, provided is a system for determining the mechanical state of an agricultural land, the system including: an agricultural machine with at least one tillage element; sensor means comprising at least one accelerometer and a gyroscope, arranged in at least one tillage element, configured to measure a vibratory signal which is produced as a result of a tillage operation of the agricultural machine on the agricultural land; a processor module, in communication with the sensor means, for determining the mechanical state of the soil from the vibratory signal measured; and communication means configured to exchange information between the sensor means and the processor module; wherein the system is configured to: obtain measurements of the vibratory signal, by the sensor means, according to a pre-established frequency; group, into data packets, the measurements obtained from the vibratory signal; transform the measurements of the vibratory signal grouped into the data packets into a frequency signal; calculate energy measurements starting from the frequency signal; and determine the mechanical state of the agricultural land, based on the energy measurements of the frequency signal, wherein the mechanical state determined comprises a degree of hardness and a degree of plasticity.

In some non-limiting embodiments or aspects, the communication means, according to one of the embodiments of the invention, includes: a main node, arranged in the agricultural machine, configured to receive the measurements of the sensor means; and a remote central server, configured to receive information based on the measurements, sent from the main node of each agricultural machine and store it in a database.

In other non-limiting embodiments or aspects, the communication means further includes one or more intermediate nodes arranged between the sensor means and the main node, the one or more intermediate nodes configured to receive the measurements of the sensor means and forward said measurements to the main node acting as a bridge.

According to another non-limiting embodiment or aspect, the sensor means includes a single sensor arranged in one of the tillage elements, a disc for example, and the communication means includes a main node which is implemented virtually in a Smartphone, wherein the Smartphone further comprises the processor module and a control computer application.

According to another non-limiting embodiment or aspect, provided is a system which further includes a wireless communications module connected to the sensor means arranged in each tillage element, the wireless communications module configured to send the measurements of the sensor means to the next node, wherein the next node is further configured to receive and transmit wireless communications.

According to another non-limiting embodiment or aspect, the central server database stores a plurality of energy patterns corresponding to a plurality of previously known mechanical states, and the processor module is further configured to compare a first energy pattern, corresponding to the energy measurements calculated, with the patterns from the database and provide a real-time estimate of the mechanical state of the agricultural land. In yet another non-limiting embodiment or aspect, the real-time estimate of the mechanical state of the agricultural land is obtained according to a mathematical regression model stored in the database.

In another non-limiting embodiment, the system is a distributed system which, according to different embodiments, can vary the computational load of the processor module between the different elements of the system. In another non-limiting embodiment, the processor module includes a general processor housed in the main node. Additionally, in another non-limiting embodiment, the processor module further includes a local processor housed in one or more intermediate nodes.

In another non-limiting embodiment, the central server has processing capacity and is configured to mainly receive, store and enable the consultation of information on a historical level of previously captured data. As the historical data thereof is enriched, machine learning algorithms such as neural networks or others are used in the central server in order to refine the calculation of the estimates of the mechanical state of agricultural lands. The output values of the algorithms are the references set by the algorithms of the processor module, such that in another non-limiting embodiment, the main nodes can determine the mechanical state of the soil without needing a constant communication with the central server.

According to another non-limiting embodiment or aspect, the processor module further includes a control system, with at least one actuator associated with the tillage element, configured to modify a physical parameter of the tillage element.

According to another non-limiting embodiment or aspect, provided is a system further including a geolocation module configured to determine the location wherein each of the measurements obtained from the vibratory signal has been obtained. Thus, advantageously, the present invention combines the location information with the characterization of the land in the database in order to, for example, generate compaction variability maps of the land in the plots, storing and analyzing the results in real time. In addition to helping the immediate response of the operator on the land, it enables the comparison of previous tasks and campaigns in order to make configuration decisions of the agricultural machines as efficient as possible.

According to another non-limiting embodiment or aspect, provided is an agricultural machine including a tractor and at least one of the following agricultural implements: cultivator, seeder, plough or any other agricultural implement intended to work agricultural soil; and wherein the tillage elements of the agricultural machine are selected from: discs, arms, ploughshares, harrows, couplings, tips, mouldboards or any other element configured to receive vibrations during a tillage operation of the agricultural machine.

In another non-limiting embodiment or aspect, the sensor means are arranged on a plurality of tillage elements of the agricultural machine according to a pre-established typology, wherein the processor module is configured to jointly process the vibratory signals obtained.

In other non-limiting embodiments or aspects, the system may determine the behavior of agricultural machines by assessing the working status of each tillage element in order to conclude, for example, if there are blockages in the specific element to which a sensor is associated or in order to determine the wear thereof, by analyzing the frequencies between the same component at the beginning and end of the useful life thereof, with which the optimal moment for the replacement thereof can be established.

In other non-limiting embodiments or aspects, multiple readings are collected (different vibration parameters related to the mechanical behavior of the soil and data for the spatial location of the implement as data is collected), characterizing the data in an independent and grouped manner. It is, therefore, a method for scalable growth and characterization of the learning, while it uses what has been learnt in order to perfect the work of the machines. Thus, it is possible to carry out a self-learning method in the field creating autonomous prediction systems.

In other non-limiting embodiments or aspects, the state of the land is determined, the behavior of the tillage elements and the impact of both on the agricultural task are analyzed, such that it is possible to optimize the cost, handling and energy consumption of the tasks for preparing agricultural lands. By making the analysis of the vibratory signals generated correspond with agricultural tillage parameters such as the degree of hardness and/or plasticity of a land when the agricultural machines perform the tillage or sowing for planting crops, it is possible to reduce the economic impact of these tasks in terms of wear of materials, diesel consumption associated with the force or intensity with which the tasks are performed and the final result necessary for the sowing.

The system of the present disclosure uses the measurements of the sensors, not only to measure the mechanical state of the soil, but it also enables the reading, communication, treatment, diagnosis, interpretation and action, thus achieving an intelligent system for interaction between the agricultural tillage components, equipped with said sensor means, and the agricultural machine. The measurements are therefore introduced into an intelligent prediction process which enables the noise (error) of the captured data to be reduced, contrasting it with previous data and obtaining a response using artificial intelligence in real time, in order to equip the system with improvements in the determination of the parameters sought, which even enable the autonomous work of the tillage elements to be reached for the preparation and sowing of agricultural lands.

BRIEF DESCRIPTION OF THE DRAWINGS

To complete the description of the invention, and for the purpose of helping to make the characteristics thereof more readily understandable, a set of drawings is included where, by way of illustration and not limitation, the following figures have been represented.

DETAILED DESCRIPTION

The present disclosure discloses a method and a system for determining the mechanical state of the soil by means of the measurements of sensors installed in the tillage elements of an agricultural machine.

The method and system of the present disclosure evaluates the measurements obtained by the sensors, in order to predict certain mechanical parameters of the soil, as a function of the analysis of the vibratory signals generated by the operation of the agricultural machine and the interaction thereof with the land. The method and system may be used by the farmers to make decisions related to agricultural planning, the operation of their machines or automation of the work processes.

An agricultural seeder, a cultivator, a plough or other agricultural implements can have 10, 20, 30 or even 100 tillage elements and the arrangement thereof in the agricultural implement is done in lines, an agricultural implement being able to have 2, 3, 4 and even 8 lines of several types of elements, which enables several land preparation tasks to be performed in a single pass of the agricultural machine on the work field. To do so, knowing in that single pass how the agricultural implement behaves in the situation of the land is optimal for the performance thereof and is one of the objectives of the present disclosure, wherein the behavior of the tools is captured during the tasks for preparing and sowing agricultural lands, measuring the vibration which is produced in the equipment due to the different mechanical behavior of the land.

The agricultural machines most commonly used in land preparation and sowing include a tractor and one or more agricultural implements such as seeders, decompactors, cultivators, or ploughs. On these agricultural implements, a series of tillage elements are arranged, which are specific for each of the tasks to be carried out. For example, the main tillage elements of the seeders are the ploughshares and the seeding discs, which are configured to open the furrow in the land. In the decompactors, the tillage elements that make contact with the land are the arms, which are configured to perform a loosening job and cause the soil to swell, while they keep the surface intact and improve water circulation and oxygenation of the earth, favoring root growth and plant development, and achieving higher yields at harvest. The cultivators have multiple functions, such as removing weeds, crushing clods, loosening the surface layer of the soil, forming fine earth in the seedbed or preparing the land for irrigation and incorporating fertilizers into the soil, and to do so they have several tillage elements such as ploughshares and cultivator arms with different models and sizes according to the task to be performed. The harrows and ploughs also have discs with different concavities and sizes in order to perform the tillage. Other tillage elements include mouldboards, agricultural ploughshares, tips, heels, blades or deflectors. All the previous elements have very specific features which make them appropriate for some tasks or others. For example, choosing concavities, sizes, degrees of hardness or toughness will depend on the mechanical conditions of the soil to be worked.

Figure 1:
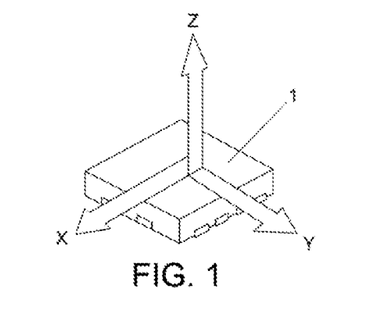
FIG. 1 represents one of the sensor motes of the present invention.

In non-limiting embodiments or aspects, the system comprises a plurality of sensors 1, which given the simplicity and small size thereof, can be referred to as "sensor mote" or "electronic mote", which is represented in FIG. 1. The basic sensor mote has vibration sensors in order to capture the behavior of an element, in contact with said sensor mote, through the vibratory signal which is propagated through said element during the operation thereof. Thus, the system is based on the configuration of accelerometer sensors in the sensor motes, although in some non-limiting embodiments they have information that is additional or optional to that of the accelerometer itself, coming from other external sensors, which the system is capable of interpreting and using.

Figure 2:
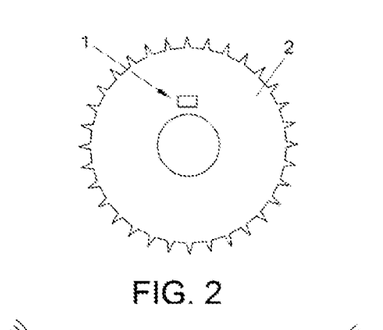
FIG. 2 represents a disc harrow, of an agricultural machine, with a coupled sensor mote.

The electronic motes are designed to be installed in any of the previously mentioned work tools for land preparation and/or sowing, capturing the vibrations received in said work tool, by the contact with the land during the operation, and transmitting the corresponding measurements to a processor module. They can be installed on the outer surface of one of the tillage elements of an agricultural implement, such as the harrow disc 2 represented in FIG. 2, in order to analyze the behavior thereof or be used to evaluate a group of elements or a body of the agricultural implement.

By way of example, the following table shows the data collected by one of the electronic motes, in this case "sensor 4", performed in two different records or zones, here referred to as "3" and "7" for a certain pass, which in this case is referred to as "11B". The table includes the measurements of the maximum PSD (MPSD), the frequency at which the maximum PSD (FMPSD) occurs and the energy accumulated in said record, which is stored in the variable energy.

| Pass | Sensor | Record | MPSD | FMPSD | energy |
|---|---|---|---|---|---|
| P11B | 4 | 3 | 73.74402 | 2.4 | 1216.849 |
| P11B | 4 | 7 | 319.7832 | 4 | 5579.943 |

Figure 3:
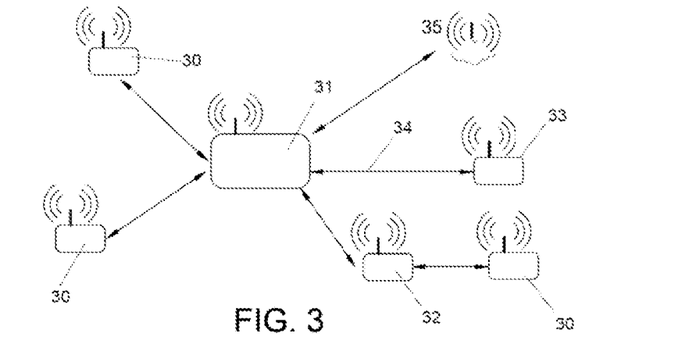
FIG. 3 schematically represents the communication and control system of the present invention.

FIG. 3 schematically shows a possible configuration of the control system of the present disclosure, wherein a communications network including several nodes for distributing the control information is envisaged. The communication between sensor motes and the main node can be performed by wiring or, for example, in the case of a large number of sensor motes, by means of a wireless connection according to the diagram of FIG. 3. With reference to FIG.

3, the sensor motes 1 have a wireless communications module 30 in order to send the multiple measurements obtained from the detected vibratory signal to a main node 31 preferably arranged in the tractor of the agricultural machine, although in other non-limiting embodiments, the main node is virtually integrated into a portable electronic device such as an electronic tablet or a mobile phone. Additionally, intermediate nodes 32 can be included to act as a bridge and forward the information to the main node. This main node acts as the master of the information, groups the sensor records in a single database and makes them available to the user and system for the analysis thereof and interaction with the environment thereof due to the control system. All the information from the main node is sent to a remote central server 35, wherein it is stored in a general database which is accessible, with the appropriate security and privacy restrictions, from the main nodes of different machines.

Optionally, the intermediate nodes can have the same computational functionalities as the main node, preventing eventual communication problems in the face of a very high number of sensor motes which, in wireless mode, could saturate a receiving limit of the intermediate node. In this manner, doubling the intermediate nodes may improve the service, regardless of the number of electronic motes. Furthermore, although the main function of the intermediate nodes is to act as a bridge, they can also be configured to process part of the information and thus reduce the computational tasks in the main node, which when it receives information from a very large number of sensors, could need a certain processing time which would cause a bottleneck.

With continued reference to FIG. 3, third party systems 33 can be connected to non-limiting embodiments of the present disclosure through a single bus 34 provided in the agricultural machine, preferably in the tractor, following a serial or Controller Area Network (CAN) bus communication protocol, according to the embodiment selected, as well as specific actuators in order to dynamically configure certain physical parameters of the tillage elements, following instructions sent by the control system. In this manner, the configuration and control of the present disclosure can be adapted to any type of final information needs of the system, also adapting the total number of nodes and sensors.

Figure 4:
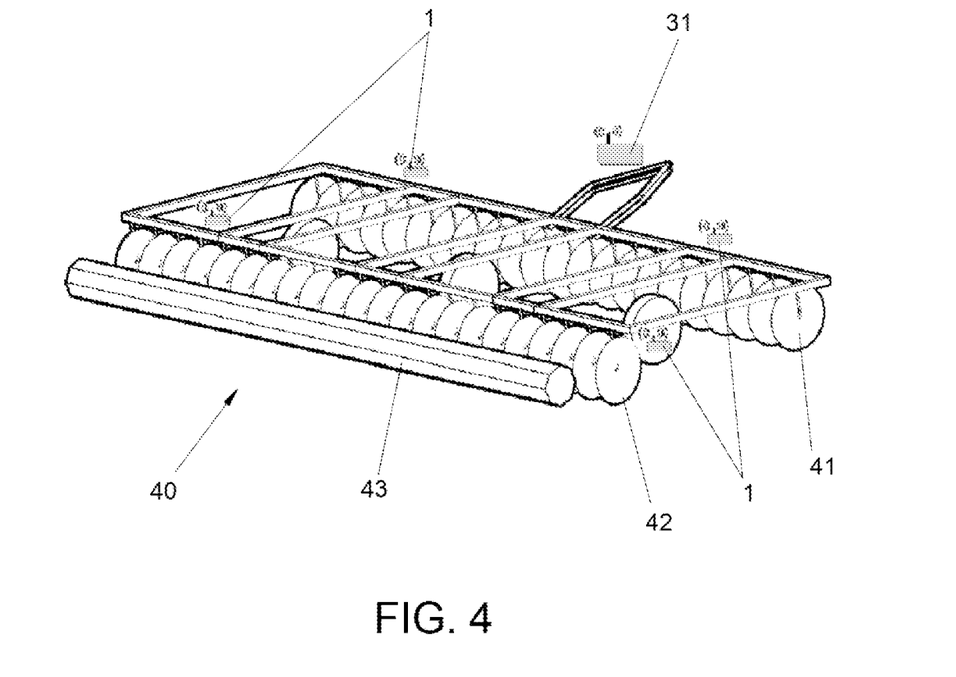
FIG. 4 represents an arrangement of sensors on an agricultural machine, according to one of the embodiments of the invention.

The arrangement of sensors on an agricultural machine 40, such as the one represented in the example of FIG. 4 wherein an agricultural implement hooked to a tractor (not represented) is shown in detail, is variable and depends on the number and distribution required by the operator in each specific case or on the control possibilities of the tillage elements and the agricultural machine in general. For example, a row arrangement makes it possible to obtain information from the body of the agricultural machine, while a group configuration enables parameters of variability within the machine to be obtained.

Specifically, the agricultural machine of FIG. 4 works with three lines of agricultural elements arranged in the agricultural implement. The first two lines 41 and 42 (the ones closest to the tractor) are disc harrows and the last line includes a compactor roller 43. Furthermore, four sensors have been distributed 1 throughout the structure of the agricultural implement. Thus, in this specific example, the agricultural machine performs two different tasks in the soil with a single pass. Taking into account that the tillage elements have several configurable parameters, such as working depth, rotation speed or angle of attack, obtaining information on the mechanical state of the soil, the present disclosure enables many possible configurations of these tillage elements to be established for each of the lines. This configuration can be established by the user in real time or it can be established automatically, according to the information stored in the database of the same land in previous years or of similar fields worked with the same or very similar agricultural machines.

For example, with continued reference to FIG. 4, for a land which has been determined as hard, the first line 41 of the agricultural implement can be automatically assigned low depth parameters and a small angle of attack, in order to perform a moderate task of disc harrowing. For another of the lines, such as line 42, although it has the same function as line 41, the comparison of the in-line sensors, enables it to be known how the land is after the work performed by the line 41 and thus make different configuration decisions, such as a smaller angle of attack and a working depth different than that of the first line, reducing the working intensity thanks to knowing the result obtained which is according to the needs of the farmer. In this case, the cost of the operation would be reduced by reducing the working intensity in terms of both power required and wear of the components of the agricultural implement. Likewise, the last line 43, corresponding to the compactor roller, will have an associated working compaction/settlement which will depend on the result of the work measured by the previous sensors, the state of the soil and the similar tasks which have been stored in the database with satisfactory results. Thus, it is possible to optimize the work of each of the lines and, therefore, that of the agricultural machine, which may allow for the reproducibility of the tasks in similar conditions.

Figure 5:
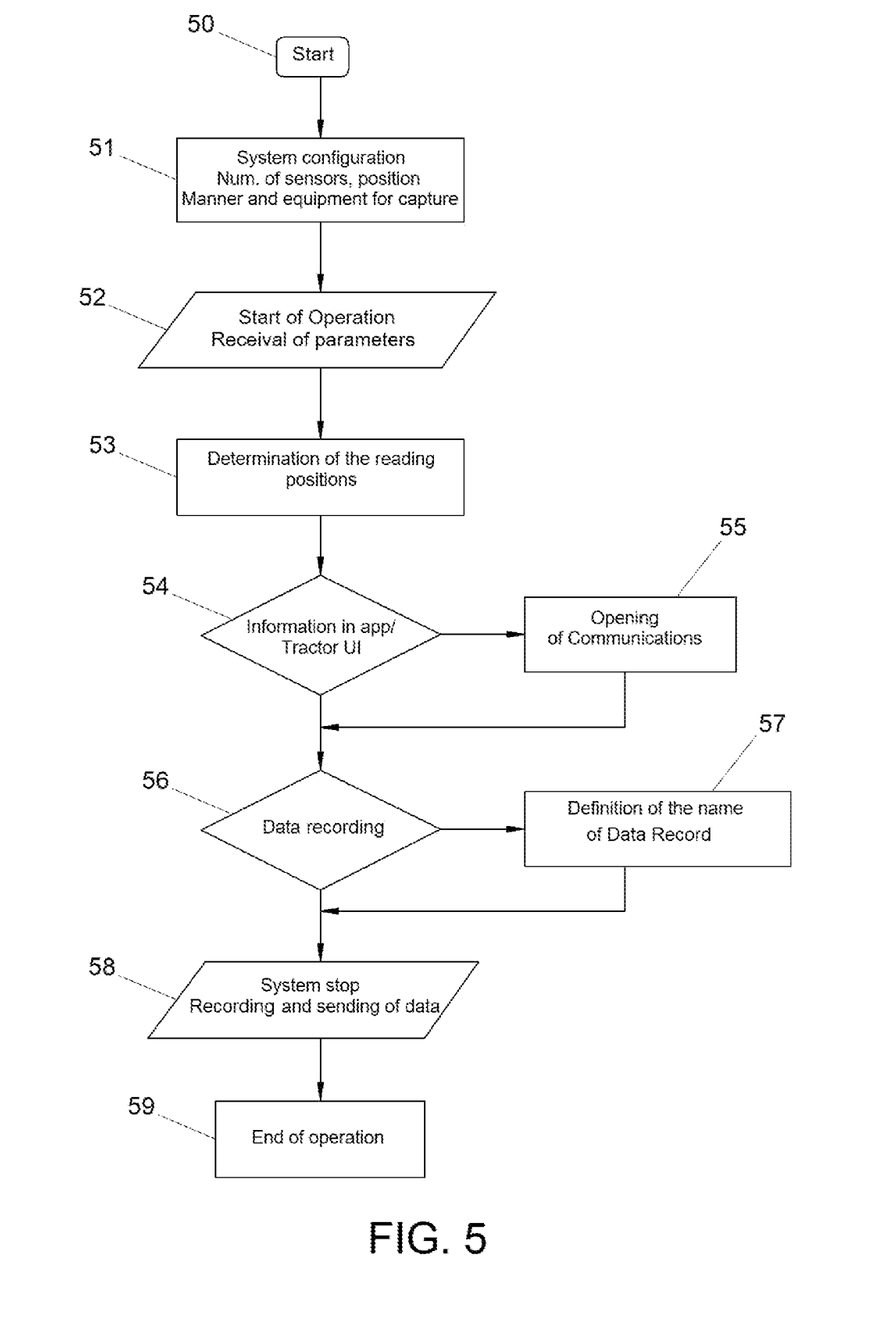
FIG. 5 represents a diagram of the information flow of the mobile application installed in an embodiment of the invention.

The system is open to configuring the number, position or type of the different sensors and the number of nodes receiving the information from the sensors. In this manner, it is possible to configure the number thereof through a mobile application or, if the equipment is connected, to the CAN bus/ISOBUS of the tractor of the agricultural machine, by means of the user interface of said tractor. FIG. 5 represents the flow diagram of the information in the mobile application comprised in one of the embodiments of the invention, or in the CAN bus/ISOBUS system of the tractor, wherein once the process 50 has started, it proceeds to the configuration 51 of the system by the user introducing the number of sensors, position, shape and type of agricultural implement of the agricultural machine; then the operation for receiving measurements 52 begins and the determination of the reading positions 53 obtained by the geolocation module. All this information is received 54 in the application, or in the absence thereof, in the user interface of the CAN bus/ISOBUS system of the tractor of the agricultural machine. On the one hand, the application opens the communications 55 of the mobile device wherein it has been installed in order to forward the information to a central server and, on the other hand, the information received is then recorded 56, wherein it is assigned a name 57 which enables it to be retrieved later. The steps of recording data and assigning names are executed continuously until the system shuts down, which causes all the data recorded to that point to be sent 58 to a database and the operation ends 59.

Figure 6:
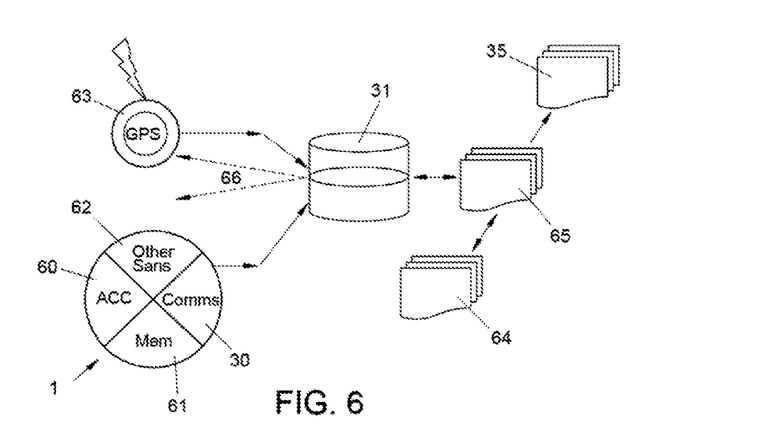
FIG. 6 shows a communication scheme of the information of the sensors, in one embodiment of the invention.

FIG. 6 shows a communication scheme of the information of the sensors, in some non-limiting embodiments, wherein the number and distribution of the sensors will depend on the information to be acquired, as described in the previous example of FIG. 4. The information flow starts from the data collected by electronic motes 1 and geolocation modules 63, passes through the field computer comprised by the main node 31 of the tractor of each agricultural machine of the system and ends in the central server 35 of the system or in a third-party machine 64. There is also the reverse path of the information flow, such that the information analysis performed in the central server or the third-party machine is sent back to the main node, wherein control instructions 66 can be sent to the electronic motes.

Detailing in more depth the communication scheme of FIG. 6, in this case, the electronic mote 1 has an accelerometer sensor 60, a memory 61, a wireless communications module 30 and other sensors 62. The information obtained by the sensors is prepared in data packets which are sent to the controller of the field computer of the main node 31, directly or through an intermediate node 32, which receives packets from any of the electronic motes, processes the packets, analyzes the interrelation thereof, especially the ones that are paired, and generates the action or record parameters.

The geolocation module 63 has a communication module for LTE/4G/3G/2G networks which sends the satellite location information (GNSS) to the controller of the field computer of the main node, wherein the synchronization and pairing of each of the measurements with the location information received are performed.

With continued reference to FIG. 6, all the information received in the main node contributes to creating a database which is available to the system for the storage and presentation thereof on any electronic device which has been previously configured. In addition to being able to be sent to the central server 35 directly or to machines from other manufacturers 64, it can also be sent to a mobile device 65 from which, chosen by the user, the data is uploaded to the central server through an Internet connection.

For communications with machines from other manufacturers or any element external to the system of the present invention, the controller is provided with an ISOBUS communication which can connect to agricultural communications and integrate the information thereof with other manufacturers and controllers through the ISO11783 standard.

Figure 7:
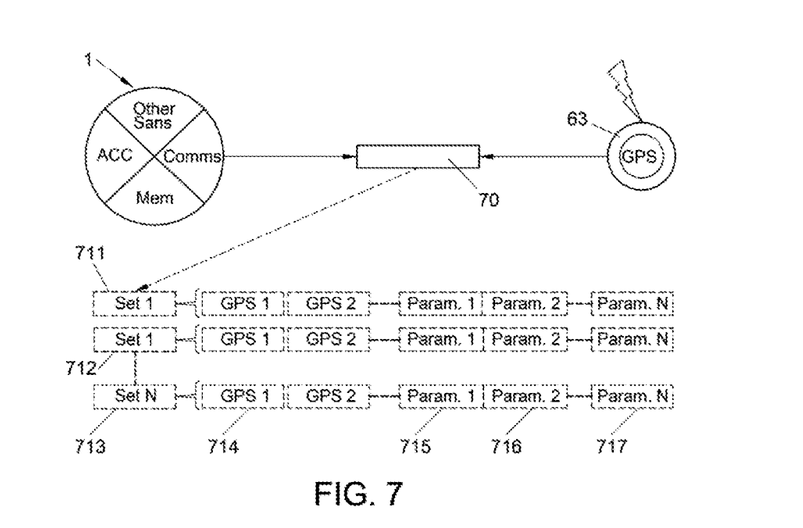
FIG. 7 shows a creation scheme of a database in one embodiment of the invention.

FIG. 7 shows a creation scheme of the database 70 of a non-limiting embodiment, wherein the information obtained by the electronic motes 1 distributed in an agricultural machine is combined with the position information obtained by the geolocation module 63. Basically, the process consists of synchronizing the data from the sensors with the position information. To do so, the sampling frequency and the recording and transmission times are taken into account, as a function of the application, for which the initially established configuration of the parameters of packet recording time and the capture frequencies of the sensors will define the sample obtained and the precision thereof. The synchronized data is grouped into different packets (711, 712, . . . 713) which are stored in an orderly manner in the database 70, wherein each of the packets in turn comprises several GPS measurements (714, 715) and several packets of measurements from the sensors (716, 717, . . . 718).

The present disclosure offers several layers of action, which can be concentrated into three tiered levels as follows: On a first level, the basic operation of the system has a sensor which takes readings of the behavior of the tillage and sowing tool on the surface of the land as the agricultural implement passes. To do so, the sensor has, in one of the embodiments of the invention, an accelerometer and a gyroscope which record the vibration generated by the interaction of the machine with the soil, affecting all the components as a result of the hardness, moisture of the land or other mechanical parameters mentioned. The processing of the recorded vibrations, as described above, enables a mechanical state of the soil to be determined, associated with certain mechanical parameters, such as hardness or plasticity, derived from said processing.

On a second level, the system has a plurality of sensors distributed at several points of the agricultural machine (preferably in the structure of the agricultural implement and the tillage elements, although some sensors can also be installed in the tractor), which obtain measurements associated with different tillage elements or groups of elements during the work. According to an example of distribution of the sensors, as represented in the example of FIG. 4, the measurements obtained by the sensors 1 coupled to the agricultural implement are sent to the main node 31, wherein a local processor analyzes, according to the spatial distribution of the sensors, the received measurements to establish differential parameters of different points of the machine.

The sensors work individually, recording individual measurements in each pass of the agricultural machine, which serves as a superficial analysis of the mechanical state of the soil, but knowing the location of all the sensors enables them to be jointly evaluated and enables the differential behavior of the agricultural machine to be determined, separating the manner in which the work is executed into groups of actuators or into bodies throughout the machine.

Some non-limiting embodiments envisage longitudinal groupings of the sensors, which enables it to be known how a first sensor gives information about how the land is before the discs or elements of the harrow act and a second sensor, arranged after the first sensor, which enables the variation of the land to be known after the harrow has acted.

Some non-limiting embodiments envisage a transversal grouping of the sensors, which enables the working intensity of the different bodies of the machine to be modified, adjusting the task to the different areas found, for example, by the wider agricultural implements.

It can proceed in a similar manner with any element currently incorporated in the agricultural machines, for example, it is of interest to control the work of harrow discs located in a first line of an agricultural machine, by means of sensors arranged in a second line and this, in turn, to be controlled from a third line. With these types of actions, it is possible to control the work of different components or areas and bodies of the machine, an important fact when simultaneously working with robotic machines that can act and react as a function of the type of soils that they encounter as they pass through the plot. Thus, it is possible for several components to work simultaneously and, acting individually on each one of them, the tasks for preparing the land can be optimized and the time and energy consumption necessary for even a single pass can be reduced, which further reduces the compaction of the land performed by the machines in each pass.

On a third level, in another non-limiting embodiment, the system interacts with other elements in addition to those of the previously explained embodiments, such as specific sensors on the market which enrich the algorithms used and increase the efficiency of the system. With this, the basic system is provided with several digital communication input ports in order to include additional signals from sensors for moisture, the amount of debris, organic matter, etc.

All the information from the sensors helps determine the mechanical parameters of the state of the land, as well as the behavior of the tillage elements, received in real time by the processor module of the system.

The processor module of the system can be implemented in the intermediate node, in the main node or be distributed between them. Any of the processing functions can likewise be performed in a processor housed in an intermediate node, in the main node or in the central server.

Additionally, the electronic mote includes a geolocation module, for example GPS, which generates position information for each of the measurements obtained by the sensors, which enables the temporal contrast of the evolution of the land and will result in automatic decision-making in the future due to the traceability of the system. Alternatively, the GPS location module can be integrated into the agricultural machine and it is the processor module which associates the measurements obtained by each of the sensors with the position information obtained by the geolocation module.

In some non-limiting embodiments or aspects, the present disclosure envisages several possibilities for delivering data. The system can be configured to send reading information to the communication devices of the users, such as mobile phones or electronic tablets wherein a specific application has been installed to do so, or only electronically when it interacts with other equipment in order to provide an automatic configuration based on information derived from previous cases with similar conditions (such as an identical agricultural machine or a similar mechanical state of the soil).

In the interaction with other equipment, in some non-limiting embodiments, the system can include an electronic board for interconnection with other systems or have its own electronic box to send the information. In this manner, both platforms, electronic board or box, enable the information to be transferred in an open format, such as ISOBUS or XML, to third-party manufacturers, with which the use thereof has been previously agreed upon, or it is integrated in a closed format so that other recipients may integrate them into their machines. Once the mechanical parameters of the land determined by the algorithms of the processor module have been transmitted, all the information is stored in the database of the central server, which according to different embodiments will be a dedicated physical server or it will be virtually implemented in the cloud, wherein it will be available in order to perform subsequent analyses of system components and of other lands.

In combination with the hardware elements detailed above comprised by the system of the present disclosure, the objective of optimizing tillage, the use of agricultural implements and sowing requires certain algorithms in the processor module in order to manage the tasks of collecting information, processing, communication and performance. These algorithms work on two levels. On a first level, a relative or local processing is performed, wherein the algorithm works exclusively according to what is found in the land, analyzing the specific plot wherein the agricultural machine is working and the differential responses given in the soil thereof, thus determining the mechanical variability of the soil by means of the massive analysis of the determinations obtained by the sensors (preferably accelerometers and gyroscopes) of the electronic motes. The result is a relative determination of the mechanical state of the soil, with degrees of hardness and plasticity referring only to the land currently being worked. The interpretation of this data enables the determination of, in addition to the degree of hardness (corresponding to high vibrations) and degree of plasticity (corresponding to low vibrations), disc failures (corresponding to the lack of data when there is supply information of the sensor), wear (corresponding to variations in the rotation frequency of an element) and useful life (corresponding to a pre-established value of rotation limits or hours of operation).

On a second level of work, the algorithms of the processor module include prediction, planning and traceability treatments of the tasks performed in the preparation of the land. The determinations go from being relative to absolute, due to the capture, management and transmission of the data to a cloud environment of different plots (the data collection process of which is repeatable and comparable, mainly the speed of the agricultural machine and the structure which determines the external excitation on the land). The storage and comparison of different positions/plots are achieved, with a large spatial differentiation between them and the data is sent to the central server. The central server usually envisages a greater processing capacity for data treatment than the processors incorporated by the intermediate/main nodes on board the agricultural machines on the land.

Once the processor module has processed all the information of a specific plot, comparing measurements obtained with measurements stored from other lands with comparable characteristics, it sends the absolute calculations back to the main node of the agricultural machine in order to proceed to parameterize the different equipment to which it is connected and the land being worked. Simultaneously, the processor module generates a map of the behavior of the equipment and tasks, which can be related to a map of mechanical behavior of the soil.

The calculations and predictions carried out by the processor module are based on all the information obtained for previous cases (or at least one initial training period) and stored in the databases. After obtaining the mechanical parameters, the parameters are used as input in analysis techniques based on artificial intelligence (such as neural networks which extract predictions from the physical parameters, based on the values measured by the sensors, or regression functions, which analyze the influence of each variable and the physical relationship thereof with the system) with the aim of predicting the mechanical behavior (output of the algorithm) of the soil in real time wherein the agricultural implements are working.

In order to establish different types of land and the associated sensor data thereof, the resistance to penetration, moisture and plasticity are previously measured with sensors available on the market and the frequency values and energies are studied through data collection campaigns for future treatment. Therefore, initial relative and absolute data is obtained with which the system is trained.

The output predictions are made in real time, which is achieved by directly providing the processor module with the instantaneous readings of the vibration sensors integrated in the tillage elements of the agricultural machines as they are obtained. The readings are obtained by the sensors in the time domain, but they are characterized and filtered by means of vibration parameters calculated in the frequency domain, wherein the diagnosis is very rich in information for these types of signals. The frequency information is a first parameterization of a mechanical behavior wherein different wavelengths are translated into energetic excitation in different frequencies. In other words, the transformation to the frequency space enables the vibratory signal to be divided into different wavelengths from which energy measurements of each of them are obtained and, with this, analyzed independently in order to be able to diagnose what physical fact is producing the vibration.

Finally, the processor module associates these readings received in real time with an output value due to the relationship/training previously determined on values obtained manually from the soil in question and contrasting the values with historical data collected in the databases of the system.

The frequency and time of capturing information by the sensors notably influences the precision and resolution of the information captured. Furthermore, the reading frequency, packing times and transmission times are variable as a function of the elements used in the agricultural implement and the parameters sought, such that, for example, studying vibrations requires a significant number of readings for the frequency study of the signal, while rotation failures or useful life do not need it. In non-limiting embodiments, the reading times used to establish the recording packets are performed in a range of frequencies between 50 and 500 Hz, in other words, data is taken from the sensors between 0.25 and 20 seconds. This ensures, on the one hand, good precision in the frequency domain, with data intervals in a frequency around deltaf=1 Hz in the worst case and precisions of spatial data in the land for data sets (packets) calculated between 0.2 and 20 meters in the plot. The size of the packets varies between 250 and 2000 data points, as a function of the type of work foreseen, machine and tillage elements.

The algorithm groups said data packets received in the processor module from as many sensors that have been installed in the agricultural machine. Said packets contain data from the accelerometer and gyroscope, which are characteristics joined and captured in a joint and three-dimensional manner, which enables the spatial displacement undergone by each position controlled by the sensor in the X, Y, Z axes to be obtained. Thus, the following values are received from each accelerometer sensor: time, AccX, AccY, AccZ, GirX, GirY and GirZ, thus knowing the change in speed and spatial direction.

From the vibration measured by the previous values, mechanical parameters are calculated such as plasticity, hardness, rotation failures of the components, and useful life or wear of the components, which relate the behavior of each of the tillage elements and the agricultural implement as a whole with the mechanical resistance of the land.

The data packets obtained are transferred from the time domain to the frequency domain for the treatment thereof as vibrations, determining parameters in frequencies which are beneficial for measuring the behavior of the soil-structure interaction and therefore of the land which is being excited with the pass of the agricultural machine.

In order to transfer the signals from the time domain to the frequency domain, the algorithms of the processor module use the Fourier Transform Function, then calculating energy measurements (such as maximum accumulated energy or the different energy peaks at different frequencies) obtained starting from the energy density or power spectral density (PSD) signal and obtaining a classification of the vibrations by means of calculated frequencies and energies, within limits between 50 and 500 hz. Energy measurements can be obtained relatively, considering the minimum and maximum values in a few first passes, in data recorded in the same area on previous dates and recorded in a database or even establishing them at all by comparing them with data measured by other methods such as penetrometers and compactors.

Once the measurements obtained in the time domain have been transferred to the frequency domain, the algorithms of the processor module apply a filtering step in order to eliminate frequencies inherent to the rotation, wear or periodic friction, such that only the frequencies inherent to the vibrations produced by soil-structure interaction remain, which enables the variability of the soil of each plot to be characterized. The filters are mainly based on identifying the repetitiveness of frequencies, extracting them and therefore reducing the noise of the readings. For example, in non-limiting embodiments the very low frequencies are eliminated (with a high-pass filter) in order to avoid the baseline effect and the high frequencies, starting from 200 Hz, are eliminated in order to avoid false measurements (with a low-pass filter). In non-limiting embodiments, a 5th order Butterworth filter is used on the signal from the accelerometer for the 0 Hz-1 Hz range.

The grouped treatment of the information enables variations in the vibratory signal to be detected after the action of each tillage element on the land, which reflects the behavior of each element in real time, since the local processor installed on board the agricultural machine receives, processes and shows all the information received and the calculations performed in an instantaneous manner. These variations in the vibratory signal reflected by the data from the gyroscope enable differences in rotational movements to be analyzed and, therefore, blockages in the tillage elements which mean poor action of the agricultural implement and the need to observe and even stop the work temporarily in order to perform repairs or readjustments in the machine.

The analysis of the signals in the frequency domain is not only used to determine the mechanical state of the soil, but it is also useful for determining the useful life of the tillage elements installed in an agricultural implement or of some portions of the structure, since the cyclical vibrations thereof, in other words, those not related to the land, change due to wear and structural variation of the elements, such as reduction in the diameters of discs or the length of tips. The parameters obtained, such as the maximum value of temporal acceleration, maximum accumulated energy or the different energy peaks in the PSD signal for specific frequencies, therefore enable, with a trained neural network, each group of readings between wear data and behavior of the tool or tools used to be characterized for that instant as a function of the land.

Therefore, according to all the previous processing, a user (farmer) of the present disclosure receives information in real time about the mechanical state of the soil, including the plasticity and hardness of the soil, failures of the tillage elements, useful life and wear thereof. Additionally, the calculation can be refined by incorporating the moisture obtained by external sensors. For example, the user receives in one of the embodiments, through a screen connected to the main node, information about in which points (according to GPS location) of the plot the hardness is higher or lower and plasticity parameters, in order to estimate if the work done by the agricultural implement thereof is more or less intense, and thus evaluate changes in the configuration of the tillage elements which prevent the equipment from being damaged (increasing the useful life) due to the abrasion or wear caused by the land. Additionally, for the equipment connected to an agricultural machine with the ability to automatically vary the configuration of the agricultural implement, the user electronically receives the same parameters for evaluating the degrees of freedom of the machine, such as the working depth, operating mode, speed, intensity, distance between shafts or the inclination of the discs.

In addition to the information and relative action, the present invention scales all the information obtained to the cloud through an LTE/4G/3G/2G connection on board the agricultural machine, with the aim of the machine connected to other equipment being able to react, thus enabling knowledge and action in real time, determining the state of the land in an absolute manner. In the absolute mode, the relative data is contrasted with the stored data of the same plot in order to obtain an absolute relationship for said plot. Likewise, this data can be compared with other plots obtaining an overall absolute variation which enables the variability found in different plots, regions and countries to be contrasted with which the treatment of the information reaches the feedback of parameters due to the richness of the variability found. Furthermore, it enables the temporal variation to be known in a relative manner in treatments throughout a campaign or from other years of the plots and, with this, knowing how the decisions made in previous years vary and influence the current state of a certain land. This means that the farmer and the system can determine whether the previous actions had the desired effects or need to be modified.

The agricultural machines wherein the proposed sensors are integrated can include harrows, cultivators, seeders and a multitude of agricultural equipment and agricultural implements, which are usually hooked to a tractor, with the aim of opening the land, removing and firming the soil, compacting it, etc. In this scenario, the present disclosure causes a reduction in passes and precision in the execution thereof, achieving an improvement in the use of each of the elements that enter to work on the tasks of preparing the soil for sowing and thereby improving performance and results of the work.

The mechanical parameters obtained directly or indirectly, by means of the readings of the sensors, enable the farmer to change the application parameters of the agricultural task or job in real time or record the state of the soil and the conditions thereof as the task is performed for the subsequent traceability of the work thereof.

The present disclosure enables the farmer to react on the fly in the agricultural implement, without waiting for the treatment of the information, by receiving in real time information about the mechanical state of the soil which comprises measurements related to the hardness or apparent density. Furthermore, information is also obtained about the behavior of the tillage element used, being able to assess the working state thereof and determine eventual blockages, as well as the wear or useful life thereof, in order to determine the optimal time for replacement.

Additionally, in some non-limiting embodiments, all this information which is presented to a user to help them make decisions is used to interact directly on the task that is being executed, thus entering into the robotic interaction with the guide of the machine. Thus, the information obtained is transmitted to the machine so that other elements of the machine can automatically actuate the components thereof and modify the manner of operating as a function of the determination that these sensors make of the state of the land. This feature is crucial for the new era of automatic machines which automatically guide tractors today, but in a short space of time they will be able to automate the operation of all agricultural tasks.

The present disclosure should not be limited by the embodiments herein described.

The invention claimed is:

1. A method for determining the mechanical state of an agricultural land comprising:
obtaining, by a sensor means arranged in a tillage element of an agricultural machine, measurements of a vibratory signal, wherein the vibratory signal is produced as a result of the contact of the tillage element with the agricultural land during a tillage operation;
sending, by communication means, the measurements obtained from the vibratory signal to a processor module, wherein the measurements obtained from the vibratory signal are grouped into data packets;
transforming, by the processor module, the measurements of the vibratory signal grouped into data packets into a frequency signal;
obtaining a power spectral density (PSD) signal starting from the frequency signal;
comparing a first energy pattern, wherein the first energy pattern corresponds to amplitude measurements of the PSD signal in a certain frequency band, with a plurality of energy patterns from a database, wherein the plurality of energy patterns from the database are associated with different mechanical states of the land assigned as a function of prior measurements by means of a penetrometer; and
determining the mechanical state of the agricultural land as a result of the comparison of the first energy pattern with the plurality of energy patterns stored in the database.

2. The method according to claim 1, further comprising:
sending the measurements of the sensor means to a main communication node arranged in the agricultural machine;
sending information based on the measurements from the main node to a central server; and
storing in the central server the information based on the measurements sent by the main node of each agricultural machine.

3. The method according to claim 1, further comprises:
determining, by the processor module, a state of the tillage element according to a variation detected in a rotation frequency of the tillage element, wherein the state of the tillage element is selected from: a locking state of the tillage element or a state with a certain degree of wear.

4. The method according to claim 1, further comprising:
modifying, by an actuator of a control system, a physical parameter of the tillage element as a function of the determined mechanical state of the agricultural land, wherein the physical parameter is selected from: working depth, angle of attack of the tillage element, distance between tillage elements, pressure of the tillage element and rotation speed of the tillage element.

5. The method according to claim 1, which further comprising:
a frequency filtering step, wherein one or more repetitive frequencies of the frequency signal are eliminated, corresponding to vibrations inherent to the operation of the tillage element.

6. A system for determining the mechanical state of an agricultural land comprising:
an agricultural machine with at least one tillage element;
sensor means, wherein the sensor means comprises at least one accelerometer and a gyroscope, wherein the at least one accelerometer and the gyroscope are arranged in at least one tillage element and configured to measure a vibratory signal which is produced as a result of the contact of the tillage element with the agricultural land during a tillage operation;
a main communication node, arranged in the agricultural machine, configured to receive measurements of the sensor means; and
a remote central server, wherein the remote control server is configured to receive information based on the measurements sent from a main node of each agricultural machine and store the information in a database, wherein the database is configured to store a plurality of energy patterns; and a processor module, in communication with the sensor means through the main node, wherein be processor module is configured to:
group, into data packets, the measurements obtained from the vibratory signal;
transform the measurements of the vibratory signal grouped into the data packets into a frequency signal;
obtain a power spectral density PSD starting from the frequency signal;
compare a first energy pattern, corresponding to amplitude measurements of the power spectral density PSD signal in a certain frequency band, with the plurality of energy patterns from the database, wherein the plurality of energy patterns from the database are associated with different mechanical states of the land assigned as a function of prior measurements by means of a penetrometer; and
determine the mechanical state of the agricultural land as a result of the comparison of the first energy pattern with the plurality of energy patterns stored in the database.

7. The system according to claim 6, wherein the communication means further comprises at least one intermediate node arranged between the sensor means and the main node, wherein the at least one intermediate node is configured to receive the measurements of the sensor means and forward the measurements to the main node acting as a bridge.

8. The system according to claim 6, further comprising a wireless communications module connected to the sensor means and arranged in each tillage element, wherein the wireless communications module is configured to send the measurements of the sensor means to a next node, wherein the next node is further configured to receive and transmit wireless communications.

9. The system according to claim 6, wherein the processor module comprises a general processor housed in the main node.

10. The system according to claim 7, wherein the processor module further comprises at least one local processor housed in the intermediate node.

11. The system according to claim 6, wherein the processor module further comprises a control system, with at least one actuator associated with the tillage element, wherein the control system is configured to modify a physical parameter of the tillage element.

12. The system according to claim 6, wherein the main node is a virtual node implemented in a portable electronic device to be selected from a mobile phone and an electronic tablet.

13. The system according to claim 6, further comprising a geolocation module configured to determine the location wherein each of the measurements obtained from the vibratory signal has been obtained.

14. The system according to claim 6, wherein the agricultural machine comprises:
a tractor and at least one of the following agricultural implements: cultivator, seeder, plough or any other agricultural implement intended to work agricultural soil; and
wherein the tillage elements of the agricultural machine are selected from: discs, arms, ploughshares, harrows, couplings, tips, mouldboards or any other element configured to receive vibrations during a tillage operation of the agricultural machine.

15. The method according to claim 1, wherein the mechanical states associated with each energy pattern in the database as a function of the prior measurements by means of the penetrometer comprise a degree of hardness and a degree of plasticity based on the prior measuring by means of the penetrometer.

* * * * *

UNITED STATES PATENT AND TRADEMARK OFFICE
CERTIFICATE OF CORRECTION

PATENT NO. : 12,442,743 B2
APPLICATION NO. : 17/442677
DATED : October 14, 2025
INVENTOR(S) : Serafín López-Cuervo Medina et al.

Page 1 of 1

It is certified that error appears in the above-identified patent and that said Letters Patent is hereby corrected as shown below:

In the Claims

Column 18, Line 28, Claim 2, delete "server" and insert -- server, --

Column 10, Line 5, Claim 6, delete "be" and insert -- the --

Signed and Sealed this
Twenty-third Day of December, 2025

John A. Squires
*Director of the United States Patent and Trademark Office*